US010502316B2

(12) United States Patent
Kurita et al.

(10) Patent No.: US 10,502,316 B2
(45) Date of Patent: Dec. 10, 2019

(54) RANGE SWITCHING APPARATUS OF SHIFT-BY-WIRE SYSTEM

(71) Applicant: Mitsubishi Electric Corporation, Tokyo (JP)

(72) Inventors: Kazuhisa Kurita, Tokyo (JP); Chiaki Sugano, Tokyo (JP); Masayuki Aota, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 295 days.

(21) Appl. No.: 15/495,242

(22) Filed: Apr. 24, 2017

(65) Prior Publication Data

US 2018/0128368 A1    May 10, 2018

(30) Foreign Application Priority Data

Nov. 4, 2016 (JP) ................................. 2016-216056

(51) Int. Cl.
*F16H 61/32* (2006.01)
*F16H 61/12* (2010.01)
*F16H 61/28* (2006.01)

(52) U.S. Cl.
CPC ............. *F16H 61/32* (2013.01); *F16H 61/12* (2013.01); *F16H 2061/122* (2013.01); *F16H 2061/1292* (2013.01); *F16H 2061/2884* (2013.01); *F16H 2061/2892* (2013.01); *F16H 2061/326* (2013.01)

(58) Field of Classification Search
CPC ..... F16H 2061/1292; F16H 2061/1296; F16H 2061/1252; F16H 2061/2892; F16H 2061/2861; F16H 2061/2884
See application file for complete search history.

(56) References Cited

U.S. PATENT DOCUMENTS 8,281,681 B2 * 10/2012 Kimura .................. F16H 61/12
                                                                  74/335
8,936,524 B2 *  1/2015 Howe ..................... F16H 61/12
                                                                  475/14

FOREIGN PATENT DOCUMENTS

JP            4833097 B2    12/2011

* cited by examiner

*Primary Examiner* — William C Joyce
*Assistant Examiner* — Randell J Krug
(74) *Attorney, Agent, or Firm* — Sughrue Mion, PLLC; Richard C. Turner

(57) ABSTRACT

A range switching apparatus of a shift-by-wire system has: a main motor; a deceleration mechanism that amplifies torque generated by the main motor; an output shaft that outputs the torque amplified by the deceleration mechanism; an auxiliary motor; and an emergency drive mechanism. The emergency drive mechanism is disposed on the auxiliary motor shaft of the auxiliary motor, and that is connected to or disconnected from the deceleration mechanism by driving of the auxiliary motor. The emergency drive mechanism transfers output of the auxiliary motor to the deceleration mechanism, and rotates the output shaft by being connected to the deceleration mechanism.

8 Claims, 5 Drawing Sheets

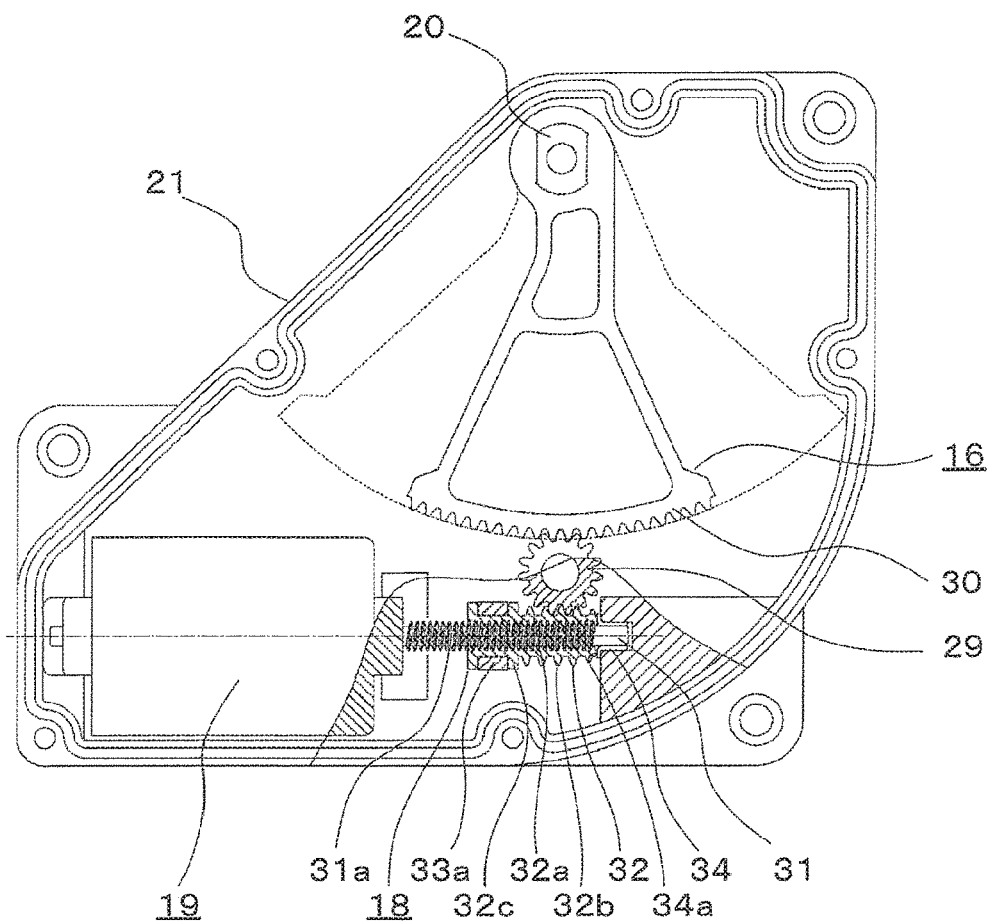
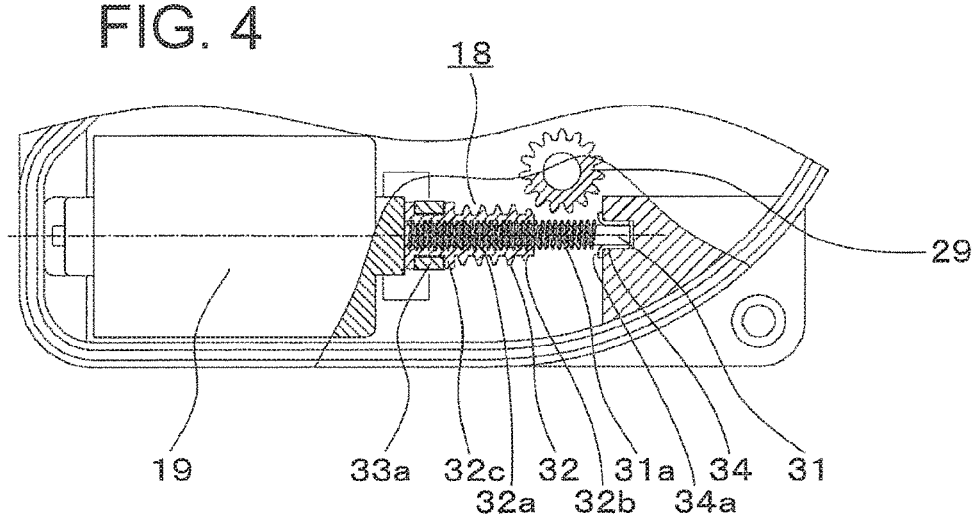

RANGE SWITCHING APPARATUS OF SHIFT-BY-WIRE SYSTEM

BACKGROUND OF THE INVENTION

1. Field of the Invention

The present invention relates to a range switching apparatus of a shift-by-wire system for operating a shift range of an automatic transmission of a vehicle by using electric signals.

2. Description of the Related Art

Generally a vehicle is demanded to be stoppable and towable even if an abnormality occurs for any reason. In the case of a conventional vehicle, the vehicle can be stopped by switching the shift range of the automatic transmission to the P range or by using a parking brake. The vehicle can also be towed by switching the shift range of the automatic transmission from the P range to another range.

On the other hand, recently a shift-by-wire system, which switches the shift range of the automatic transmission of a vehicle by an electric signal based on an instruction of the vehicle driver, is used for vehicle control. In a vehicle to which the shift-by-wire system is applied, the shift range of the automatic transmission is electrically switched, hence if an abnormality occurs to the power supply or the power supply system, as in the case of a complete battery discharge, disconnection and the like, switching of the shift range of the automatic transmission becomes difficult. Therefore, even for a vehicle to which the shift-by-wire system is applied, a range switching apparatus, which allows switching the shift range of the automatic transmission even if an abnormality occurs for any reason, is demanded.

In the case of the conventional range switching apparatus, power to supply to a range control unit is stored in the capacitor. Therefore even if an abnormality occurs to the battery or power supply system, the automatic transmission can be switched to the P range at least once by using the power stored in the capacitor, whereby the vehicle can be stopped. The shift range of the automatic transmission can be manually switched from the P range to another range by operating a lever. Thereby the vehicle can be towed (e.g. see Japanese Patent No. 4833097).

SUMMARY OF THE INVENTION

In the case of the above mentioned conventional range switching apparatus, it is assumed that when power cannot be supplied due to, for instance, an abnormality of the power supply system, the power stored in the capacitor is supplied to the actuator, and the shift range can be switched to the P range only once. However, if the abnormality is zero battery voltage or a power supply failure, such as a disconnection, power cannot be stored in the capacitor, and the shift range cannot be switched.

With the foregoing in view, it is an object of the present invention to provide a range switching apparatus of a shift-by-wire system, which can switch to the P range with certainty, even when the power supply is subject to an abnormality.

A range switching apparatus of a shift-by-wire system according to this invention has: a main motor; a deceleration mechanism that amplifies torque generated by the main motor; an output shaft that outputs the torque amplified by the deceleration mechanism; an auxiliary motor that includes an auxiliary motor shaft; and an emergency drive mechanism disposed on the auxiliary motor shaft, and that is connected to or disconnected from the deceleration mechanism by driving of the auxiliary motor, and transfers the output of the auxiliary motor to the deceleration mechanism and rotates the output shaft by being connected to the deceleration mechanism.

In the range switching apparatus of the shift-by-wire system of this invention, the emergency drive mechanism, which can be connected to or disconnected from the deceleration mechanism by the driving of the auxiliary motor, is disposed on the auxiliary moto shaft, and the output of the auxiliary motor is transferred to the deceleration mechanism, and the output shaft is rotated by connecting the emergency drive mechanism to the deceleration mechanism, therefore even when the power supply is subject to an abnormality, the shift range can be switched to the P range with higher certainty.

BRIEF DESCRIPTION OF THE DRAWINGS

FIG. 3 is a perspective plan view with a partial cross-sectional view depicting a key portion of the range switching apparatus in FIG. 1;

FIG. 4 is a perspective view with a partial cross-sectional view depicting a normal state of the auxiliary motor and the emergency drive mechanism in FIG. 3;

DESCRIPTION OF THE PREFERRED EMBODIMENTS

Embodiments of the invention will be described with reference to the drawings.

Embodiment 1

Figure 1:
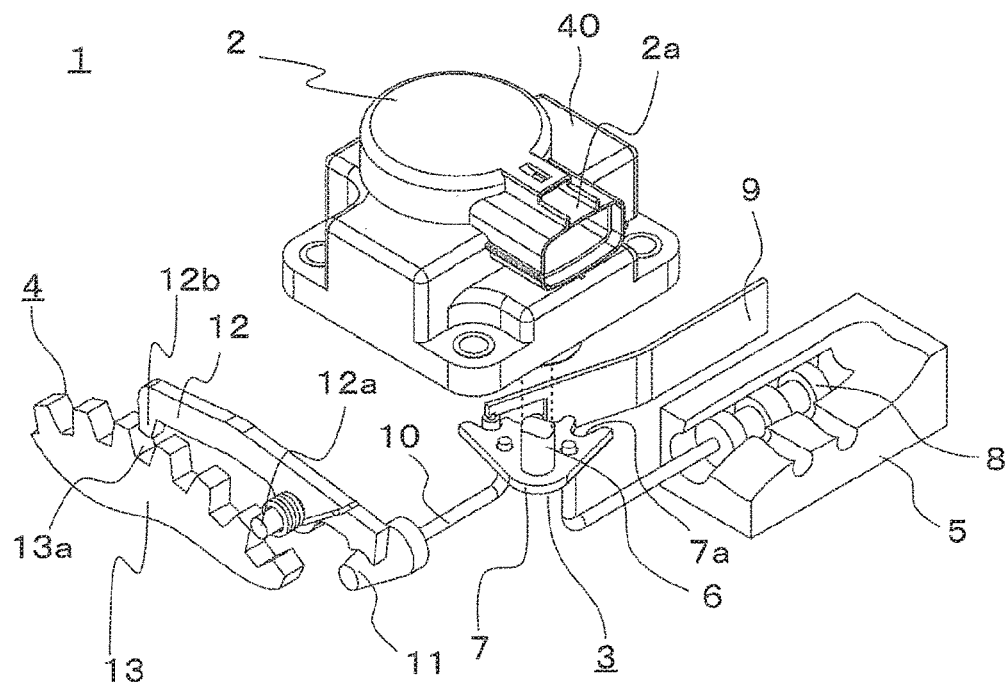
FIG. 1 is a perspective view depicting a shift range switching mechanism unit of a shift-by-wire system according to Embodiment 1 of this invention.

FIG. 1 is a perspective view depicting a shift range switching mechanism unit of a shift-by-wire system according to Embodiment 1 of this invention. In FIG. 1, the shift range switching mechanism unit 1 includes a range switching apparatus 2, a detent mechanism 3, a parking mechanism 4, a valve body 5 and a spool valve 8.

The range switching apparatus 2 is installed in an automatic transmission (not illustrated) installed in a vehicle, for example. A connector 2a is disposed in the range switching apparatus 2. A shift signal, which is an electric signal, is supplied to the connector 2a. The shift signal is generated by the vehicle driver operating a shift lever (not illustrated), which is a range selecting unit.

The detent mechanism 3 includes a shift shaft 6 which is driven by the range switching apparatus 2, a detent plate 7 which is installed in the shift shaft 6 and is approximately fan-shaped, and a detent spring 9 which is fixed to the valve body 5. Based on a shift signal, the range switching apparatus 2 integrally rotates the shift shaft 6 and the detent plate 7 in the forward direction or the reverse direction.

The spool valve 8, which is capable of reciprocating, is housed in the valve body 5. The spool valve 8 is connected to the detent plate 7. Thereby the spool valve 8 moves inside the valve body 5, interlocking with the rotation of the shift shaft 6 and the detent plate 7. As a result, the oil passage in the valve body 5 is switched, and the shift range is switching among P (parking), R (reverse), N (neutral) and D (drive).

A plurality of plate concave portions 7a are disposed on the edge of the detent plate 7. These plate concave portions 7a correspond to each range position of the spool valve 8 respectively. The detent spring 9 functions as a plate spring. The tip of the detent spring 9 is inserted into the plate concave portion 7a and is pressed against the base portion of the plate concave portions 7a. Thereby the detent plate 7 is positioned and held at each range position.

The parking mechanism 4 includes a parking rod 10, a conical unit 11, a parking pole 12 and a parking gear 13. The base end of the parking rod 10 is connected to the detent plate 7. The conical unit 11 is fixed to the tip of the parking rod 10.

The parking pole 12 can rotate around the shaft 12a, which is disposed in an intermediation portion of the parking pole 12. The conical outer peripheral surface of the conical unit 11 contacts a first end of the parking pole 12. A torsion spring, which applies force to the parking pole 12 in a direction that presses the first end to the conical unit 11, is disposed on the shaft 12a. A pole convex portion 12b, which faces the outer periphery of the parking gear 13, is disposed on a second end of the parking pole 12.

The rotary motion of the detent plate 7 is transferred to the conical unit 11 as a linear motion via the parking rod 10. In other words, when the detent plate 7 rotates, the conical unit 11 moves in the shaft direction. Thereby the outer diameter of the conical unit 11, with which the first end of the parking pole 12 is in contact, changes, and the position of the pole convex portion 12b changes direction to contact with or separate from the parking gear 13.

A plurality of gear concave portions 13a are disposed on the outer periphery of the parking gear 13. When the pole convex portion 12b fits with the gear concave portion 13a, the parking mechanism 4 is locked, and rotation of a central output shaft (not illustrated) of the parking gear 13 is prevented. When the pole convex portion 12b is disengaged from the gear concave portion 13a, the parking mechanism 4 is unlocked and the central output shaft can rotate.

Figure 2:
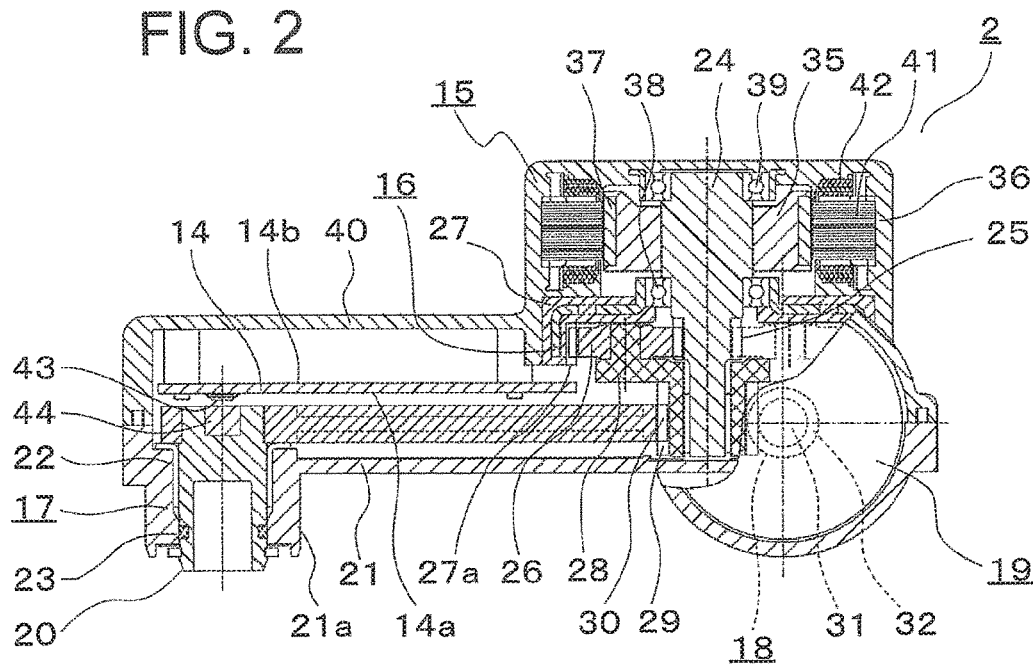
FIG. 2 is a longitudinal sectional view of the range switching apparatus in FIG. 1.

FIG. 2 is a longitudinal cross-sectional view of the range switching apparatus 2 in FIG. 1, and FIG. 3 is a perspective plan view with a partial cross-sectional view depicting a key portion of the range switching apparatus 2 in FIG. 1. FIG. 3 illustrates a state of emergency. The range switching apparatus 2 includes a control board 14, a main motor 15, a deceleration mechanism 16, a range switching unit 17, an emergency drive mechanism 18, an auxiliary motor 19, a front body 21 and a rear body 40.

The front body 21 and the rear body 40 are combined and constitute a housing of the range switching apparatus 2. The control board 14 is fixed to the rear body 40. The control board 14 generates a control signal based on a shift signal from a shift lever in the vehicle interior.

The main motor 15 is controlled by a control signal from the control board 14. The main motor 15 is a brushless motor using permanent magnets. The main motor 15 includes a main motor shaft 24 which is rotatably supported, a rotor 35 which is press-fitted and fixed to the main motor shaft 24, and a stator 36, which is disposed on a same axis as the rotation center of the rotor 35, and is fixed to the rear body 40.

The main motor shaft 24 is rotatably held in the rear body 40 by a first rolling bearing 38 and a second rolling bearing 39. The rotor 35 includes a plurality of rotor magnets 37. Each rotor magnet 37 is fixed inside the rotor 35 by adhesive or the like.

The stator 36 includes an annular stator core 41 and a plurality of coils 42. A plurality of stator teeth, which protrude inward in the diameter direction, are formed in the stator core 41. The coils 42 are wound around the stator teeth respectively. The coils 42 constitute the three-phase (U phase, V phase and W phase) connection.

The deceleration mechanism 16 is connected to the main motor 15 and amplifies the generated torque of the main motor 15. The deceleration mechanism 16 also includes a planetary gear deceleration mechanism and a spur gear deceleration mechanism. In concrete terms, the deceleration mechanism 16 includes a sun gear 25, a planetary gear 26, an annular gear 27, a carrier 28, a small gear 29 and a large gear 30.

The sun gear 25 is fixed to the main motor shaft 24. The planetary gear 26 is engaged with the sun gear 25. The annular gear 27 is fixed so as to be coaxial with the central axis of the main motor 15. The annular gear 27 has internal teeth 27a which engage with the planetary gear 26.

The carrier 28 supports the planetary gear 26 so that rotation and revolution are possible. The carrier 28 is rotatably held by the outer periphery of the main motor shaft 24, which protrudes toward the planetary gear 26.

The small gear 29 is fixed to the carrier 28 at the opposite side of the planetary gear 26. The large gear 30 is approximately fan-shaped, and is engaged with the small gear 29.

The range switching unit 17 is connected with the deceleration mechanism 16. The range switching unit 17 switches the shift range by rotating the shift shaft 6 of the detent mechanism 3. Further, the range switching unit 17 includes an output shaft 20, a rolling bearing 22, and an annular seal member 23.

A support cylindrical portion 21a is disposed in the front body 21, so as to surround the output shaft 20. The output shaft 20 is rotatably held in the support cylindrical portion 21a via a rolling bearing 22. The large gear 30 is fixed to the output shaft 20.

The output shaft 20 is disposed some distance from the shaft center of the main motor shaft 24. This allows disposing the small gear 29 and the large gear 30.

An annular groove 20a is disposed on the outer periphery of the output shaft 20 on the front side. The seal member 23 is press-fitted into the annular groove 20a, so as to be sandwiched between the output shaft 20 and the support cylindrical portion 21a. Thereby the inside of the front body 21 is held in an air tight or fluid tight state.

The deceleration mechanism 16 is also connected to the auxiliary motor 19 via the emergency drive mechanism 18 only when an emergency occurs. The auxiliary motor 19 includes an auxiliary motor shaft 31. The auxiliary motor shaft 31 is disposed in the direction orthogonal to the main motor shaft 24.

The electric supply system of the auxiliary motor 19 is different from the electric supply system of the main motor 15. For example, electricity to the auxiliary motor 19 is supplied from an auxiliary power supply (not illustrated).

However, electricity to the auxiliary motor 19 may be supplied from an interruptible power supply via a switch, such as a relay.

Figure 5:
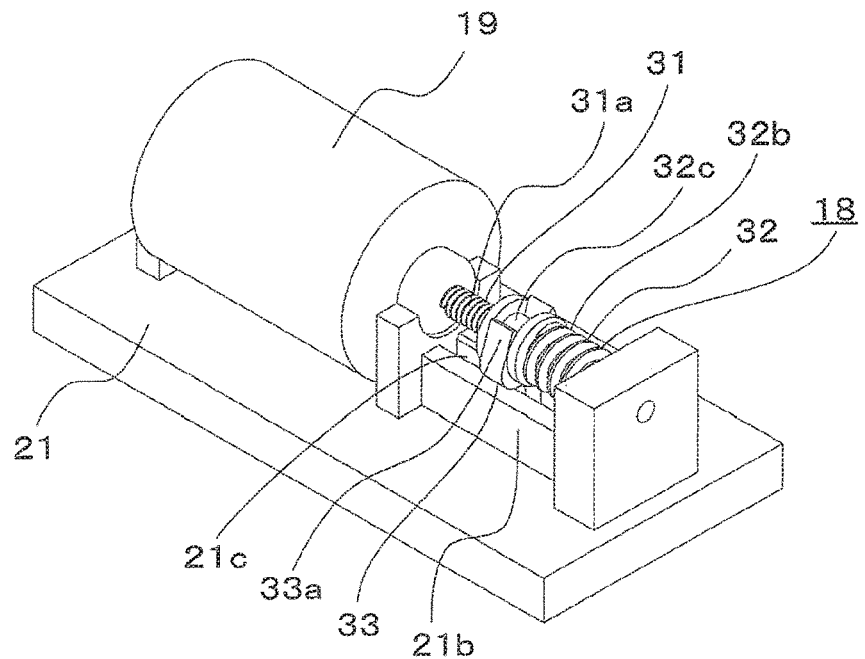
FIG. 5 is a perspective view depicting the auxiliary motor and the emergency drive mechanism in FIG. 3.
Figure 6:
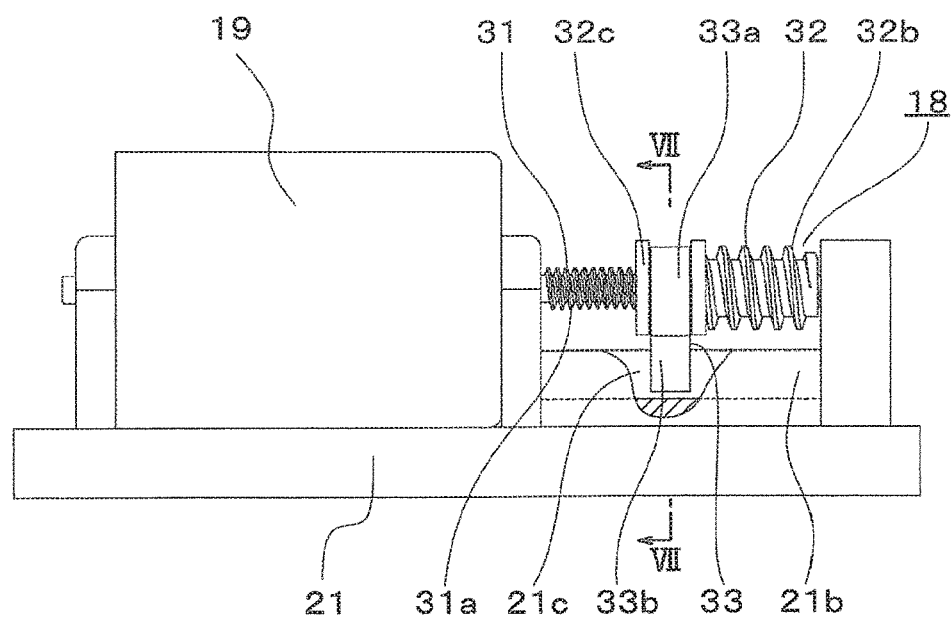
FIG. 6 is a side view depicting the auxiliary motor and the emergency drive mechanism in FIG. 5.
Figure 7:
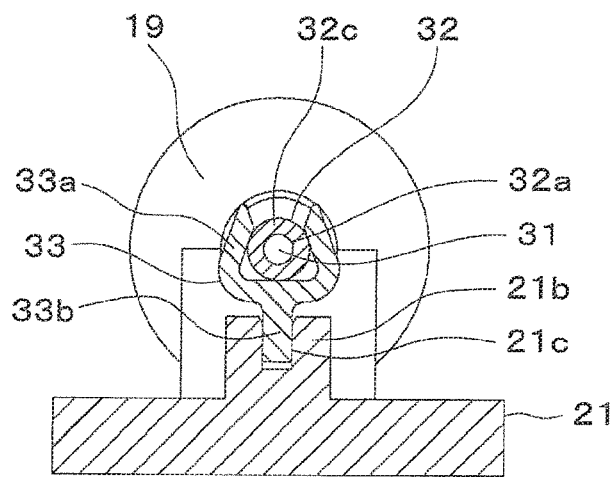
FIG. 7 is a cross-sectional view along the VII-VII line in FIG. 6.

FIG. 4 is a perspective plan view with a partially cross-sectional view depicting a normal state of the auxiliary motor 19 and the emergency drive mechanism 18 in FIG. 3, FIG. 5 is a perspective view depicting the auxiliary motor 19 and the emergency drive mechanism 18 in FIG. 3, FIG. 6 is a side view depicting the auxiliary motor 19 and the emergency drive mechanism 18 in FIG. 5, and FIG. 7 is a cross-sectional view along the VII-VII line in FIG. 6.

The emergency drive mechanism 18 is disposed on the auxiliary motor shaft 31, and is configured to be connected to or disconnected from the deceleration mechanism 16 by the driving of the auxiliary motor 19. The emergency drive mechanism 18 transfers the output of the auxiliary motor 19 to the deceleration mechanism 16 and rotates the output shaft 20 by being connected to the deceleration mechanism 16.

Further, the emergency drive mechanism 18 includes a feed screw 31a, a cylindrical auxiliary gear body 32, a gripping member 33, a receive member 34, and a pair of guide rails 21b. The feed screw 31a is disposed on the outer periphery of the auxiliary motor shaft 31.

Figure 8:
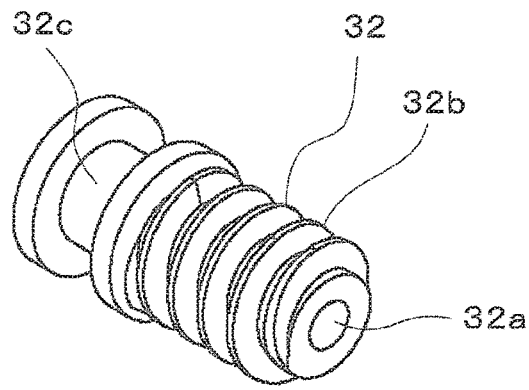
FIG. 8 is a perspective view depicting the auxiliary gear body in FIG. 5.

The auxiliary gear body 32 surrounds the feed screw 31a. In other words, the auxiliary motor shaft 31 penetrates through the auxiliary gear body 32. As illustrated in FIG. 8, the auxiliary gear body 32 includes a screw hole 32a which engages with the feed screw 31a, a gear portion 32b which engages with the small gear 29 in an emergency, and a bobbin-like cylindrical portion 32c.

The auxiliary gear body 32 moves in the shaft direction of the auxiliary motor shaft 31 by rotating the auxiliary motor shaft 31. The gear portion 32b is a worm gear. The cylindrical portion 32c is disposed adjacent to the edge of the gear portion 32b in the shaft direction on the auxiliary motor 19 side.

The receive member 34 is fixed to the front body 21. The tip portion of the auxiliary motor shaft 31 is inserted into the receive member 34. The tip portion of the auxiliary motor shaft 31 is rotatably held by the receive member 34.

The receive member 34 also has a flange portion 34a which faces the end face of the auxiliary gear body 32 in the shaft direction. When the auxiliary gear body 32 moves toward the small gear 29 in an emergency, the end face of the auxiliary gear body 32 contacts the flange portion 34a. It is preferable that the receive member 34 is constituted by a material of which friction coefficient, with respect to the auxiliary gear body 32, is lower than that of the front body 21.

The guide rails 21b are formed on the front body 21. The guide rails 21b are parallel with each other, and are parallel with the auxiliary motor shaft 31. A linear guide groove 21c is formed between the guide rails 21b. The guide groove 21c is disposed directly below the auxiliary motor shaft 31.

Figure 9:
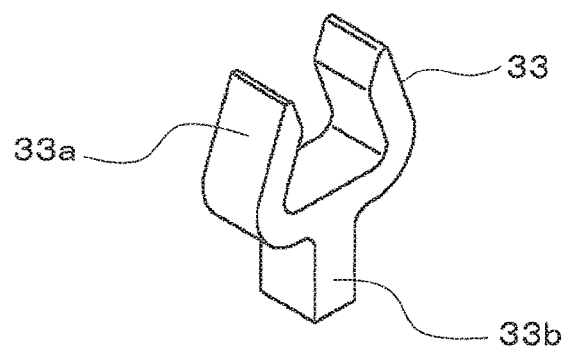
FIG. 9 is a perspective view depicting the gripping member in FIG. 5.

As illustrated in FIG. 9, the gripping member 33 includes a gripping portion 33a constituted by two arms having spring properties, and a block-type leg portion 33b which is disposed in a lower part of the gripping portion 33a.

The gripping portion 33a grips the cylindrical portion 32c so as to hold it with two arms. The gripping portion 33a generates friction force with respect to the cylindrical portion 32c, so as to inhibit the rotation of the auxiliary gear body 32. The leg portion 33b is inserted into the guide groove 21c. The guide rails 21b guide the movement of the gripping member 33 along the auxiliary motor shaft 31, and restrict rotation of the gripping member 33.

Referring back to FIG. 2, the control board 14 has a first surface 14a and a second surface 14b, which is an opposite surface of the first surface 14a. The first surface 14a faces the end face of the output shaft 20 in the shaft direction. The second surface 14b faces a part of the annular gear 27.

A sensor 43 is installed in a position of the control board 14 which faces the output shaft 20. The sensor 43 detects the range switching position by detecting a rotation angle of the output shaft 20. A magnetic flux direction detection type magnetic sensor is used for the sensor 43.

A detection magnet 44 is fixed to the end face of the output shaft 20 in the shaft direction. The sensor 43 faces the detection magnet 44. The sensor 43 also detects the rotation position using the change in the magnetic flux of the detection magnet 44 caused by the rotation of the output shaft 20.

Operation will be described next. The torque generated in the main motor 15 is decelerated by the sun gear 25, the planetary gear 26, the annular gear 27 and the carrier 28, and is transferred to the small gear 29. The torque transferred to the small gear 29 is further decelerated by the large gear 30 which engages with the small gear 29, and is transferred to the output shaft 20.

Normally when the shift range is switched by the main motor 15, the auxiliary gear body 32 is maintained in a state of being disengaged from the small gear 29, as illustrated in FIG. 4. Therefore the auxiliary motor 19 does not apply a load to the main motor 15.

On the other hand, when the control unit determines that the main motor 15 cannot switch the shift range, due to, for instance, a drop in the supply voltage to the range switching apparatus 2 or power failure, the shift range switching by the main motor 15 is changed to the shift range switching by the auxiliary motor 19. In other words, power supply to the main motor 15 is stopped, and power is supplied to the auxiliary motor 19, whereby the auxiliary motor shaft 31 is rotated.

Here the gripping force of the gripping portion 33a, with respect to the auxiliary gear body 32, is set to be higher than the rotational friction resistance force of the feed screw 31a. Further, the rotation of the gripping member 33 is controlled by the leg portion 33b that is inserted into the guide groove 21c. As a result, rotation of the auxiliary gear body 32 is inhibited even if the auxiliary motor shaft 31 starts to rotate.

Therefore because of the rotation of the auxiliary motor shaft 31, the auxiliary gear body 32 advances toward the tip of the auxiliary motor shaft 31 along the auxiliary motor shaft 31. Then, while the auxiliary gear body 32 is moving, the gear portion 32b engages with the small gear 29.

Then, when the auxiliary gear body 32 contacts the flange portion 34a of the receive member 34, the rotation force of the feed screw 31a becomes higher than the gripping force of the gripping portion 33a applied to the auxiliary gear body 32, hence the cylindrical portion 32c slips relative to the gripping portion 33a, and the auxiliary gear body 32 starts to rotate along with the auxiliary motor shaft 31.

When the auxiliary gear body 32 rotates, the small gear 29 engaging with the gear portion 32b rotates, the large gear 30 and the output shaft 20 also rotate, and the shift range is switched to the P range by the driving force of the auxiliary motor 19 without requiring any other driving force.

As described above, in the normal operation, the emergency driving path used by the auxiliary motor 19 can be disconnected from the normal driving path used by the main motor 15, so that the shift range can be switched by rotating the auxiliary motor 19 only in an emergency.

For the main motor 15, a motor with high output is used, since high torque and high responsiveness are demanded when the shift range is switched from the P range. Therefore the main motor 15 cannot drive if the voltage is lower than the normal operation voltage range.

For the auxiliary motor 19 which is only used to switch the shift range to the P range in an emergency, a motor with lower torque and lower responsiveness than the main motor 15 can be used. For example, an inexpensive DC brush motor can be used for the auxiliary motor 19. In this way, the auxiliary motor 19 can drive with voltage lower than the main motor 15, and in the case of using an auxiliary power supply, the capacity thereof can be low.

If it is determined that the shift range can be switched by the main motor 15 after the supply voltage returns to the normal state, power is supplied to the auxiliary motor 19 from the normal power supply or the auxiliary power supply, and the auxiliary motor shaft 31 is rotated in a direction the opposite from the rotation direction when the shift range is switched to the P range.

Thereby rotation of the auxiliary gear body 32 is inhibited again by the gripping force of the gripping portion 33*a*, and the auxiliary gear body 32 moves backward toward the auxiliary motor 19. Because of this, the gear portion 32*b* and the small gear 29 are disengaged, the emergency driving path is cleared, and the normal driving path used by the main motor 15 is reestablished.

According to this range switching apparatus 2, in which the auxiliary motor 19 and the emergency drive mechanism 18 are added, the shift range can be switched to the P range with higher certainty even when power was abnormal, that is, when the supply voltage dropped or power supply failed, and switching the shift range by the main motor 15 becomes difficult. Further, the driving path can be switched to the emergency driving path and the shift range can be quickly switched to the P range merely by driving the auxiliary motor 19.

When the supply voltage recovers, the driving path can be returned to the normal driving path of the main motor 15 by inversely driving the auxiliary motor 19.

Further, the feed screw 31*a* is disposed in the auxiliary motor shaft 31, and the screw hole 32*a* is disposed in the auxiliary gear body 32, so that the auxiliary gear body 32 moves along the auxiliary motor shaft 31 by the rotation of the auxiliary motor shaft 31 and the gear portion 32*b* engages with the small gear 29. Therefore the emergency drive mechanism 18 can be connected to or disconnected from the deceleration mechanism 16 using a simple configuration.

Further, the guide rails 21*b* and the gripping member 33 are disposed in the emergency drive mechanism 18, hence the auxiliary gear body 32 can be moved along the auxiliary motor shaft 31 using a simple configuration.

Further, the flange portion 34*a* is disposed in the receive member 34, hence the auxiliary gear body 32 can be smoothly rotated in a state where the auxiliary gear body 32 is in contact with the receive member 34.

Further, the gear portion 32*b* is a worm gear, hence the auxiliary motor 19 can be disposed such that the auxiliary motor shaft 31 is in a direction orthogonal to the main motor shaft 24.

Further, the electric supply system of the auxiliary motor 19 is different from the electric supply system of the main motor 15, hence the auxiliary motor 19 can be driven with higher certainty, even when a power supply abnormality occurs.

For the auxiliary motor 19, a motor of which torque is lower than that of the main motor 15 is used, hence the auxiliary motor 19 can be driven at low voltage, and the auxiliary motor 19 can be driven with higher certainty, even when a power supply abnormality occurs.

Embodiment 2

Figure 10:
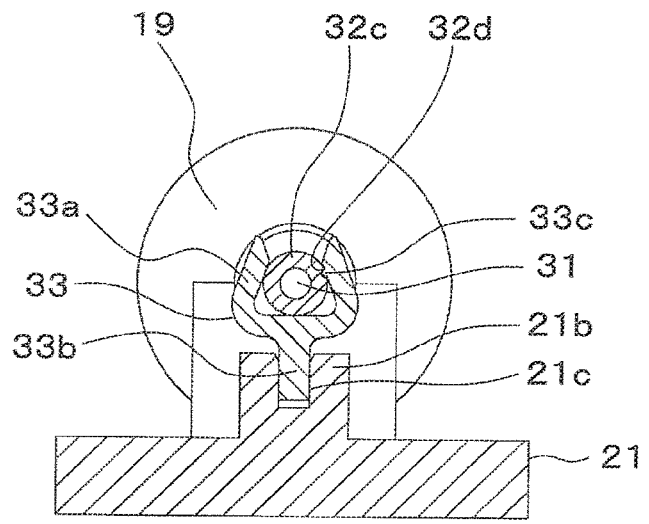
FIG. 10 is a cross-sectional view of a key portion of a range switching apparatus of a shift-by-wire system according to Embodiment 2 of this invention.

FIG. 10 is a cross-sectional view of a key portion of a range switching apparatus 2 of a shift-by-wire system according to Embodiment 2 of this invention, and indicates a cross-section corresponding to FIG. 7 in Embodiment 1. In Embodiment 2, a fitting protrusion 33*c* is disposed in the gripping portion 33*a*. A fitting hole 32*d*, in which the fitting protrusion 33*c* is fitted, is disposed on the outer peripheral surface of the cylindrical portion 32*c*. The rest of the configuration is similar or identical to that of Embodiment 1.

According to this range switching apparatus 2, the fitting protrusion 33*c* is fitted into the fitting hole 32*d*, hence in addition to the effect of Embodiment 1, the holding force, to inhibit the rotation of the auxiliary gear body 32, can be stably generated.

In Embodiment 2, the fitting protrusion 33*c* is disposed in the gripping portion 33*a*, and the fitting hole 32*d* is disposed on the outer peripheral surface of the cylindrical portion 32*c*, but this may be reversed.

A number of fitting protrusions 33*c* or fitting holes 32*d* is not limited to one.

Embodiment 3

Figure 11:
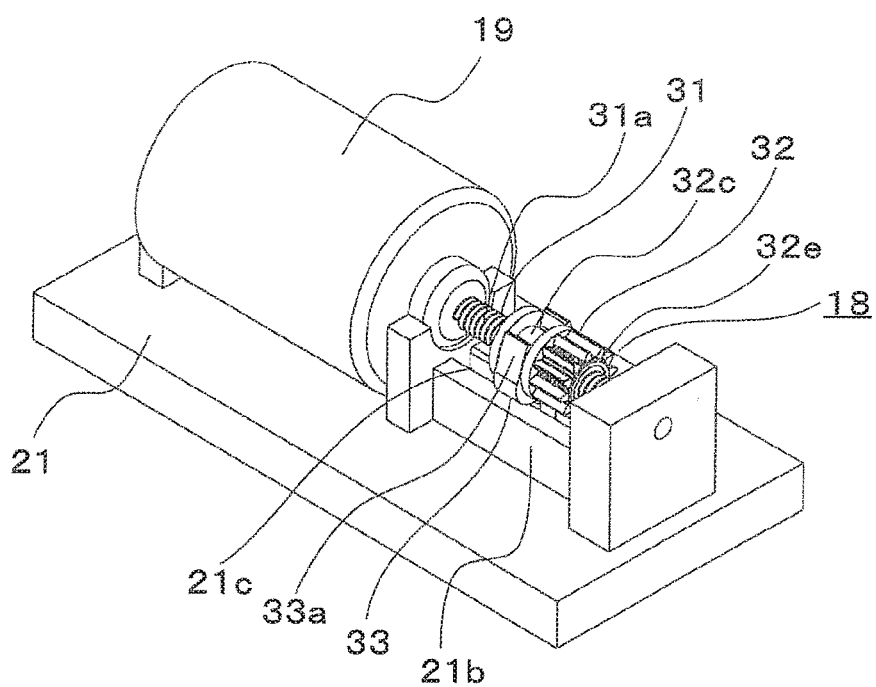
FIG. 11 is a perspective view depicting a key portion of a range switching apparatus of a shift-by-wire system according to Embodiment 3 of this invention.

FIG. 11 is a perspective view depicting a key portion of a range switching apparatus of a shift-by-wire system according to Embodiment 3 of this invention, and indicates a portion corresponding to FIG. 5 in Embodiment 1. In Embodiment 3, a gear portion 32*e*, which is a spur gear, is disposed in the auxiliary gear body 32, instead of the gear portion 32*b* of Embodiment 1. The rest of the configuration is similar or identical to that of Embodiment 1 or 2.

According to this range switching apparatus 2, the mounting direction of the auxiliary motor 19 in Embodiment 1 can be changed. Therefore when the mounting position of the auxiliary motor 19 is not ideal in the configuration of the apparatus or in terms of the mounting space of the vehicle, choices in the mounting direction of the auxiliary motor 19 can be expanded.

In Embodiment 3, a spur gear is used for the gear portion 32*e*, but the type of the gear portion is not limited to this, and may be a helical gear, for example.

In Embodiments 1 to 3, the emergency drive mechanism 18 is connected to the small gear 29, but may be connected to another gear of the deceleration mechanism 16, such as a large gear 30 or a part of the planetary gear 26.

In this invention, each embodiment may be freely combined, and each embodiment may be appropriately modified or omitted with the scope of the invention.

What is claimed is:

1. A range switching apparatus of a shift-by-wire system, comprising:
   a main motor;
   a deceleration mechanism that amplifies torque generated by the main motor;
   an output shaft that outputs the torque amplified by the deceleration mechanism;
   an auxiliary motor that includes an auxiliary motor shaft; and
   an emergency drive mechanism disposed on the auxiliary motor shaft, that is connected to or disconnected from the deceleration mechanism by driving of the auxiliary motor, and that transfers the output of the auxiliary motor to the deceleration mechanism and rotates the output shaft by being connected to the deceleration mechanism,
   wherein the emergency drive mechanism includes:

a feed screw disposed on the auxiliary motor shaft; and
an auxiliary gear body that surrounds the feed screw and moves along the auxiliary motor shaft by the rotation of the auxiliary motor shaft, and wherein a gear portion that engages with a gear of the deceleration mechanism is disposed in the auxiliary gear body.

2. The range switching apparatus of a shift-by-wire system according to claim 1, wherein
the emergency drive mechanism further includes a gripping member, and a guide rail that guides move of the gripping member along the auxiliary motor shaft and restricts rotation of the gripping member,
the gripping member includes a gripping portion that grips the auxiliary gear body, and
the auxiliary gear body moves along the auxiliary motor shaft by the rotation of the auxiliary motor shaft, as the rotation of the auxiliary gear body is inhibited by the gripping force of the gripping portion applied to the auxiliary gear body.

3. The range switching apparatus of a shift-by-wire system according to claim 2, wherein
a fitting protrusion is disposed on either one of the outer periphery surface of the auxiliary gear body and the gripping portion, and a fitting hole, which the fitting protrusion fits into, is disposed on the other of the outer peripheral surface of the auxiliary gear body and the gripping portion.

4. The range switching apparatus of a shift-by-wire system according to claim 1, wherein
the emergency drive mechanism includes a receive member that rotatably holds a tip portion of the auxiliary motor shaft, and
a flange portion, to which an end face of the auxiliary gear body contacts, is disposed in the receive member.

5. The range switching apparatus of a shift-by-wire system according to claim 1, wherein
the gear portion is a worm gear.

6. The range switching apparatus of a shift-by-wire system according to claim 1, wherein
the gear portion is a spur gear.

7. The range switching apparatus of a shift-by-wire system according to claim 1, wherein
an electric supply system of the auxiliary motor is different from an electric supply system of the main motor.

8. The range switching apparatus of a shift-by-wire system according to claim 1, wherein
the auxiliary motor is a motor of which torque is lower than that of the main motor.

* * * * *